United States Patent
Meneely, Jr.

(10) Patent No.: US 6,743,091 B2
(45) Date of Patent: Jun. 1, 2004

(54) CARBON MONOXIDE VENTING SYSTEM

(76) Inventor: William J. Meneely, Jr., 2567 Ardmore Pl., Bellmore, NY (US) 11710

(*) Notice: Subject to any disclaimer, the term of this patent is extended or adjusted under 35 U.S.C. 154(b) by 0 days.

(21) Appl. No.: 10/321,028

(22) Filed: Dec. 17, 2002

(65) Prior Publication Data

US 2003/0087600 A1 May 8, 2003

Related U.S. Application Data

(63) Continuation of application No. 10/125,321, filed on Apr. 18, 2002, now Pat. No. 6,503,141, which is a continuation-in-part of application No. 08/915,451, filed on Aug. 20, 1997, now abandoned, which is a continuation-in-part of application No. 09/152,042, filed on Sep. 12, 1998.

(51) Int. Cl.[7] .............................................. F24F 7/007
(52) U.S. Cl. ....................................... 454/343; 454/357
(58) Field of Search ................................ 454/343, 354, 454/341, 357

(56) References Cited

U.S. PATENT DOCUMENTS

| | | | |
|---|---|---|---|
| 4,257,319 A | 3/1981 | Kucharczyk | 98/37 |
| 4,742,761 A | 5/1988 | Horstman | 98/1.5 |
| 4,819,551 A | 4/1989 | Vole | 340/632 |
| 4,893,113 A | 1/1990 | Park et al. | 165/11.1 |
| D308,646 S | 6/1990 | Grilk | D10/81 |
| 5,039,006 A * | 8/1991 | Habegger | 236/11 |
| 5,120,271 A | 6/1992 | Shtanko | 454/137 |
| 5,215,498 A | 6/1993 | Wong | 454/208 |
| 5,239,980 A | 8/1993 | Hilt | 126/116 A |
| 5,276,434 A | 1/1994 | Brooks | 340/632 |
| 5,428,964 A | 7/1995 | Lobdell | 236/44 C |
| 5,576,739 A | 11/1996 | Murphy | 340/3.4 |
| 5,682,145 A | 10/1997 | Sweetman | 340/632 |
| 5,742,516 A | 4/1998 | Olcerst | 250/430 |
| 5,917,420 A | 6/1999 | Gonzalez | 340/691.7 |
| 6,110,038 A | 8/2000 | Stern | 340/527 |
| 6,318,150 B1 * | 11/2001 | Temple | 73/23.31 |
| 6,339,379 B1 | 1/2002 | Argus et al. | 340/539 |

* cited by examiner

Primary Examiner—Derek S. Boles
(74) Attorney, Agent, or Firm—Alfred M. Walker

(57) ABSTRACT

A carbon monoxide ventilation system, comprising a carbon monoxide sensor, a fan, and a vent. The carbon monoxide sensor supplies power to the fan when a threshold level of carbon monoxide is detected. The fan includes a motor and a propeller which draws air into the fan unit, and expels the air through the vent. The sensor also includes an indicating device which produces an audio or visual indication that the threshold level has been reached. The indication continues until reset by a reset button.

9 Claims, 5 Drawing Sheets

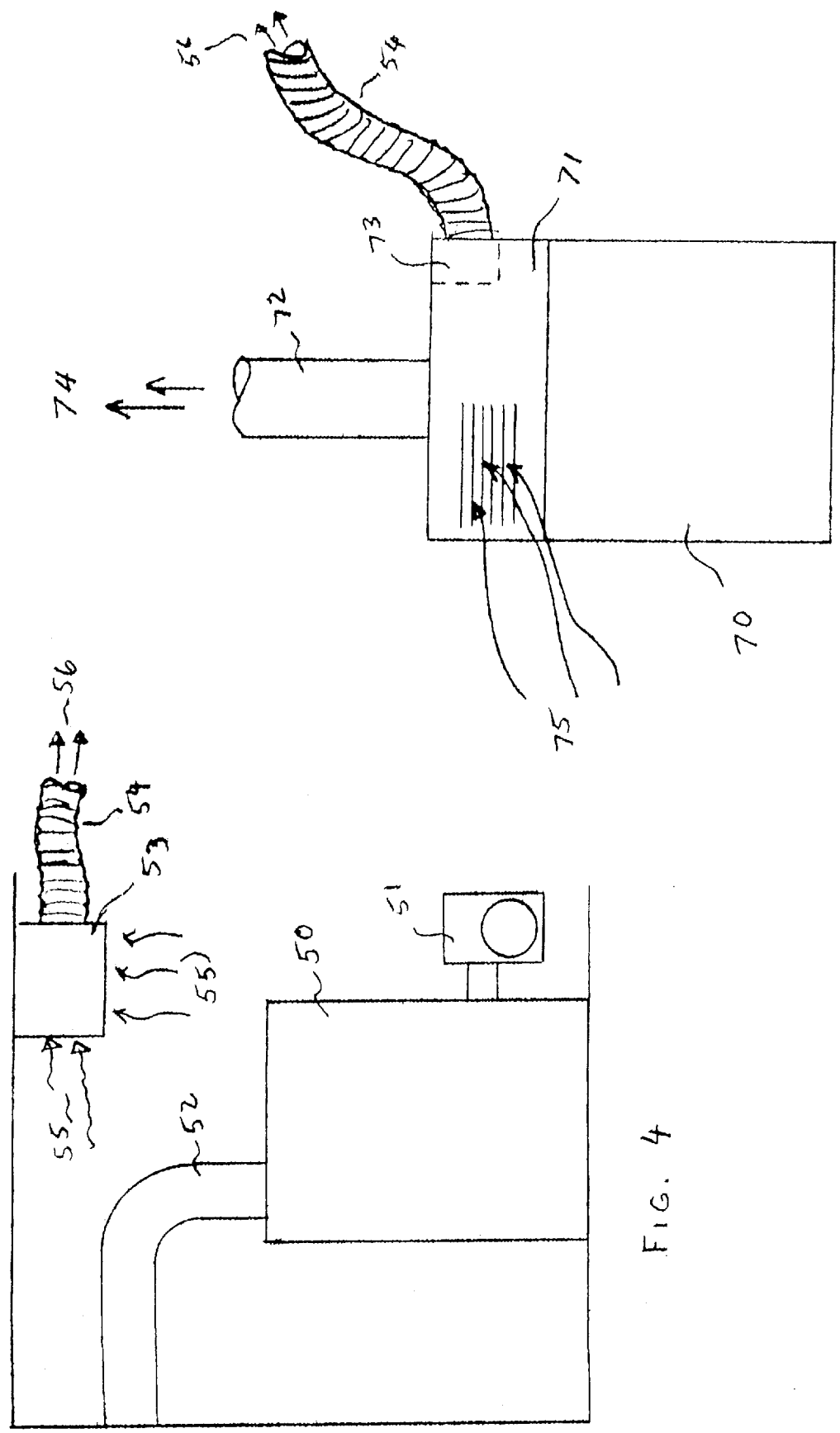

CARBON MONOXIDE VENTING SYSTEM

CROSS REFERENCES AND RELATED SUBJECT MATTER

This application is a continuation of application Ser. No. 10/125,321, filed Apr. 18, 2002 now U.S. Pat. No. 6,503,141, which is a continuation-in-part of application Ser. No. 08/915,4451, filed in the United States Patent Office on Aug. 20, 1997 now abandoned, which was a continuation-in-part of application Ser. No. 09/152,042, filed Sep. 12, 1998.

BACKGROUND OF THE INVENTION

The invention relates to a carbon monoxide venting system. More particularly, the invention relates to a system for detecting an abnormal level of carbon monoxide, and then activating a ventilation system to dissipate the carbon monoxide, while warning others of its presence.

Carbon Monoxide is a silent killer. The blood absorbs carbon monoxide instead of oxygen, and then is unable to release the carbon monoxide. Thus, the body is starved of oxygen as the blood is unable to carry oxygen from the lungs to cells throughout the body. Brain damage and death can occur quite quickly, especially when exposed to high levels of carbon monoxide. A person being poisoned by carbon monoxide is unaware of the danger, the only symptom of carbon monoxide poisoning is drowsiness, which leads to sleep and then death.

Despite the dangers to biological organisms from monoxide, it is still ever-present in our lives. Home heating systems create carbon monoxide. Typically the carbon monoxide produced is vented through the exhaust chimney. However, if the chimney becomes clogged with soot, dirt, and debris, carbon monoxide can escape into the home. Countless people are killed every winter from just this circumstance.

Automobile exhaust contains large amounts of carbon monoxide. Carbon monoxide is therefore present in garages, and other locations where automobiles operate in relatively confined spaces. Despite the fact that the dangers of carbon monoxide in these environments is well known, countless accidents still occur every year.

U.S. Pat. No. 4,819,551 to Vole discloses a safety system for smoke and fumes. The unit in Vole detects fumes and automatically opens the garage door in response thereto.

Moreover, while Vole '551 discloses an exhaust fan communicating with a carbon monoxide detector, it does not communicate with simultaneous shutdown of a building furnace, and does not include all of the salient features of the present invention, such as the alarm override reset feature, the flexible conduit and the rain shield with no moving parts. The moving flap of Vole '551 requires springs and switches, and can possibly become sticky and less openable with dirt, dust and other natural clogging substances, such as airborne particles in the thin edges at its seams.

U.S. Pat. No. 5,120,271 of Shtanko is concerned with a carbon monoxide detector and fan for a motor vehicle. However, Shtanko '271 does not describe such a detector and fan in a building structure, wherein the outlet of the vent is oriented downward, or where the detector and fan are located at a furnace source of carbon monoxide.

U.S. Pat. No. 5,239,980 of Hilt et al describes a carbon monoxide sensor for a furnace which shuts off the furnace when a threshold of carbon monoxide is detected.

However, Hilt '980 does not describe or suggest combining such a system with an exhaust means to exhaust any carbon monoxide fumes before they are dissipated throughout the building.

In contrast to the system of Hilt '980, it is important to rapidly dissipate any carbon monoxide, since carbon monoxide, while lighter than air, has a close specific gravity of 0.967 when compared to a specific gravity of 1.0 for air. In contrast, methane is a true lifting gas with a specific gravity of 0.554, so it will tend to lift, as when used in a balloon. Therefore, while carbon monoxide will initially rise since it is lighter than air, it will rapidly defuse throughout any portion of a room, and not just stay near the top of a room at its ceiling or roof, as methane does.

As a result there is a need not only to detect carbon monoxide and to shut off a defective furnace producing the carbon monoxide, but also to rapidly exhaust it from any adversely affected interior living space.

U.S. Pat. No. 5,276,434 of Brooks describes a portable carbon monoxide detector.

Furthermore, U.S. Pat. No. 5,917,420 of Gonzalez discloses a smoke/fire detector which is connected to an alarm apparatus which shakes a piece of furniture, such as a bed, chair or other piece of furniture, to awake a hearing impaired or other person. In Gonzalez '420, a smoke, fire or gas detector generates a signal that energizes an electric motor that produces vibrations which cause the bed, chair or other article of furniture to vibrate and shake its occupant. The shaking occurs when the rotary power of the motor engages a cam, which further engages a vibratory plunger located on an underside of the bed, chair or other article of furniture. However, Gonzalez does not describe or suggest the use of an exhaust fan to exhaust carbon monoxide when detected.

U.S. Pat. No. 5,215,498 to Wong et al discloses a ventilation controller, for regulating the concentration of carbon dioxide gas within a closed room, since the presence of carbon dioxide, as opposed to carbon monoxide, might indicate the presence of fire.

U.S. Pat. No. 4,257,319 to Kucharczyk discloses a room ventilating device which is capable of opening and closing vents when noxious gas concentration in a room rises above a predetermined level.

However, a limitation with some of these units is that they sound an alarm when a noxious gas concentration is present. Thus, if the gas concentration dissipates, the alarm stops sounding. Therefore, if no one is present to hear the alarm, a dangerous gas situation might never get the attention it deserves, and might not be corrected until tragic consequences occur.

SUMMARY OF THE INVENTION

It is an object of the invention to produce a carbon monoxide venting system which detects the presence of carbon monoxide and then activates a ventilating system to dissipate the carbon monoxide in response thereto.

It is another object of the invention to produce a carbon monoxide venting system which detects a dangerously high concentration of carbon monoxide, and issues a warning signal in response thereto, the warning persists until manually reset by the user.

It is a further object of the invention to produce a carbon monoxide venting system which provides a visual warning that the system has been activated, said visual warning persisting until reset.

It is a still further object of the invention to provide a carbon monoxide venting system which is inexpensive to manufacture and easy to install.

The invention is a carbon monoxide ventilation system, comprising a carbon monoxide sensor, a fan, and a vent. The carbon monoxide sensor supplies power to the fan when a threshold level of carbon monoxide is detected. The fan includes a motor and a propeller which draws air into the fan unit, and expels the air through the vent. The sensor also includes an indicating device which produces an audio or visual indication that the threshold level has been reached. The indication continues until reset by a reset button.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

The present invention can best be understood in connection with the accompanying drawings. It is noted that the invention is not limited to the precise embodiments shown in drawings, in which:

FIG. 4 is side elevational view of another embodiment of an oil-fired hydronic heating system with a carbon monoxide exhaust system of this invention;

FIG. 5 is a front elevational view of a further alternate embodiment of a gas fired hot air furnace with a built-in carbon monoxide exhaust system of this invention; and, FIG. 6 is a block diagram of the carbon monoxide exhaust system for use with heating systems.

DETAILED DESCRIPTION OF THE PREFERRED EMBODIMENTS

Figure 1:
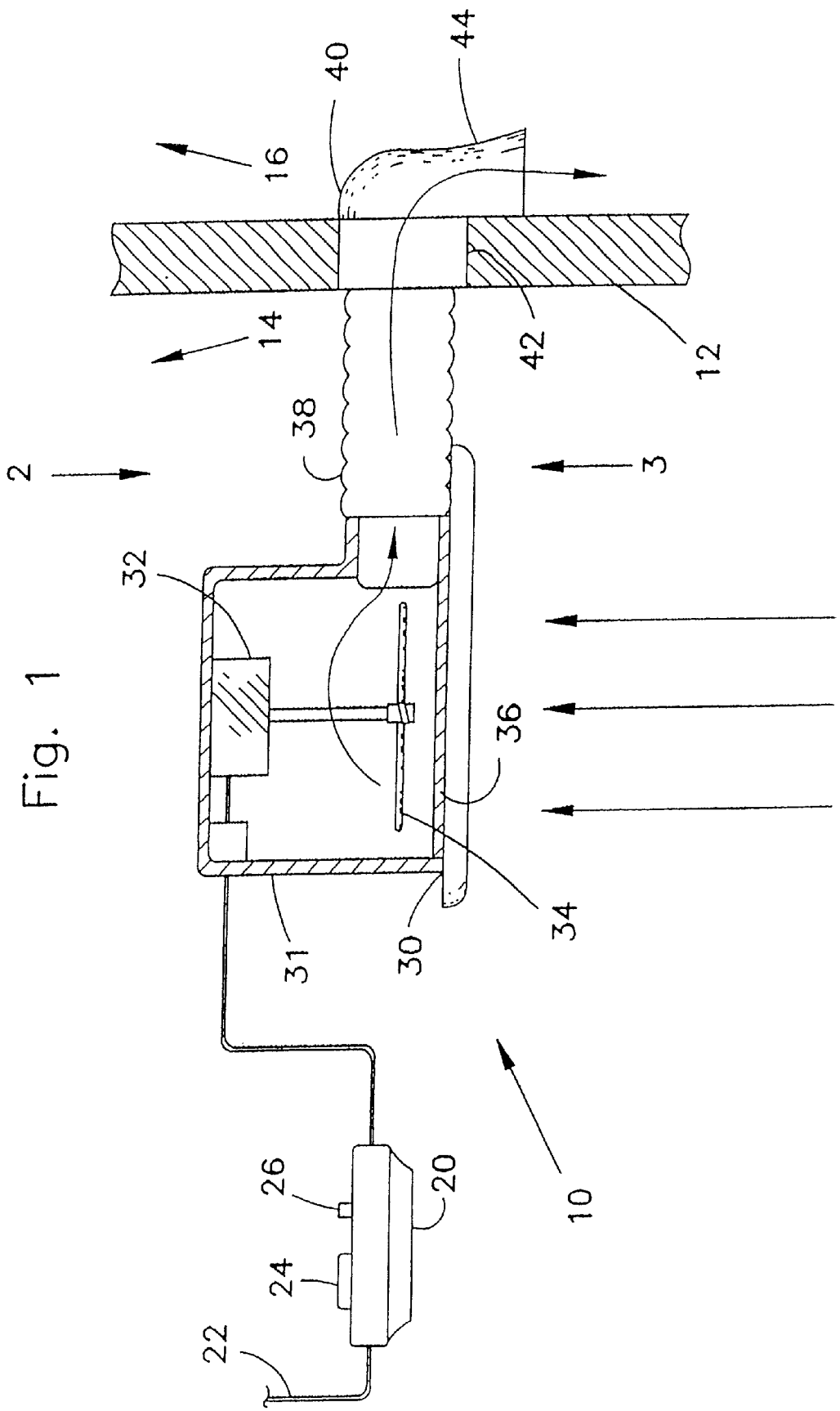
FIG. 1 is a side elevational view, with parts broken away, illustrating the major components of the carbon monoxide ventilation system according to the present invention.

FIG. 1 illustrates a carbon monoxide ventilation system 10. The system 10 is mounted near a wall 12 which provides a barrier between an interior area 14 and exterior area 16. The system 10 includes a carbon monoxide sensor 20, a fan unit 30 and a vent 40.

The carbon monoxide sensor 20 is supplied power by a power source 22. The carbon monoxide sensor 20 acts as a switch, supplying power to the fan unit 30 when a threshold carbon monoxide level is present, and disconnecting power from the fan unit 30 when carbon monoxide levels are below the threshold. The carbon monoxide sensor 20 also has an indicating device 24, which indicates when the carbon monoxide sensor 20 has been activated. It is an important feature of the invention that the indication persists until reset by pressing a reset button 26. The indication may be audible or visual. Preferably an indicating light is used for the indicating device 24 to provide visual indication.

The indicating device 24 will indicate to personnel that the system 10 has been activated. Thus it will be known that a carbon monoxide problem is present. A leaking system can be repaired before the problem becomes more serious. Once notification is made, the indicating device 24 can be reset by simply pressing the reset button 26.

In addition, when the sensor 20 detects a dangerously high level of carbon monoxide, a distinct warning is produced by the indicating device 24. The distinct warning may be a beeping or warbling sound if an audio indication device 24 is used, or a flashing light if a visual indicating device 24 is used.

The fan unit 30 has a housing 31, which contains a motor 32, which turns a propeller 34. The propeller 34 draws air into the housing 31 through a filter 36, and then expels the air through an exhaust tube 38.

The vent 40 includes a thru connector 42 which extends through the wall 12, and a rain outlet 44. The rain outlet 44 is external to the wall 12, and prevents water from entering the vent 40 and getting into the fan unit 30 The fan unit 30 is connected to the vent 40 by attaching the exhaust tube 38 to the thru connector 42.

Figure 2:
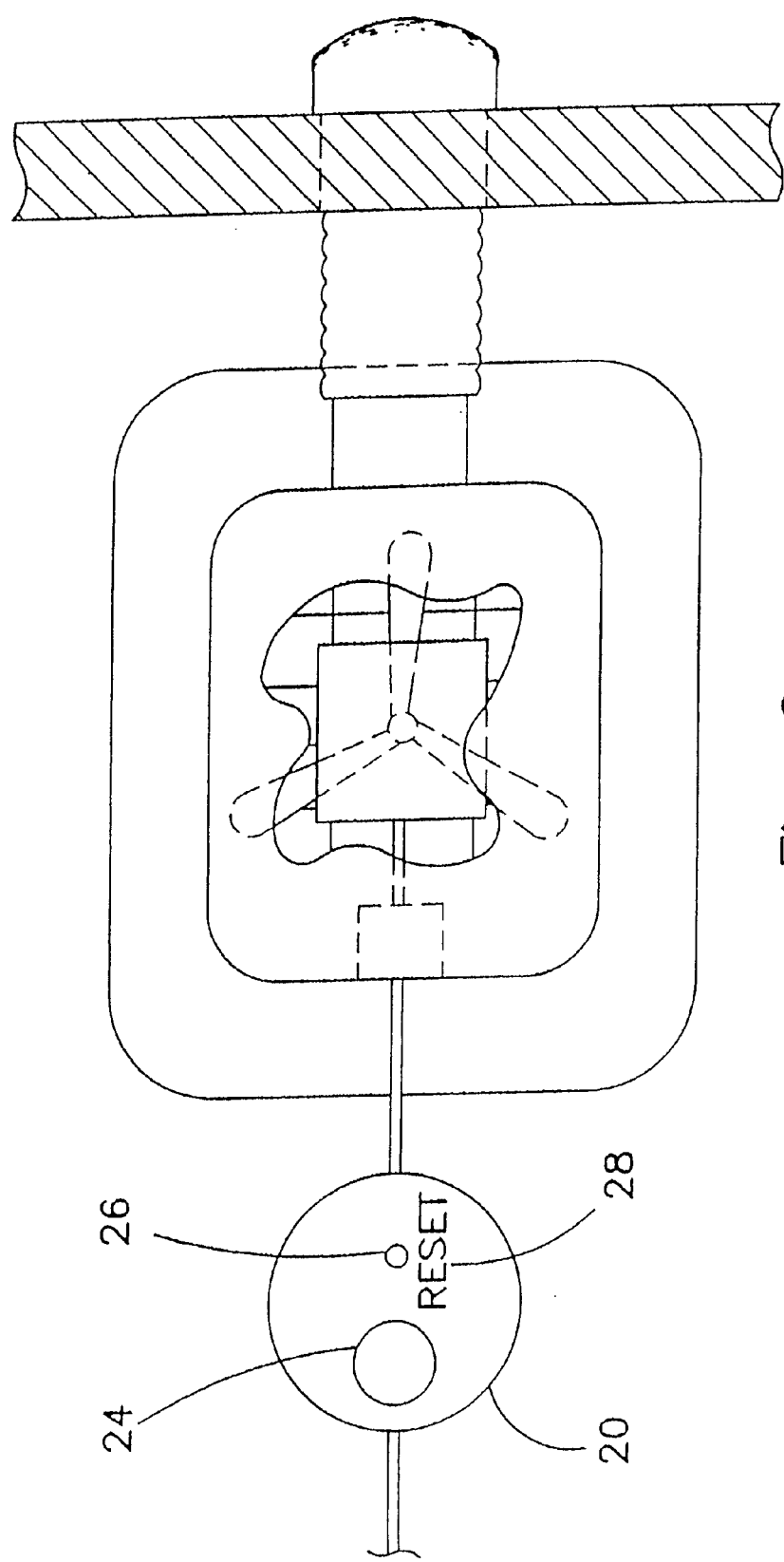
FIG. 2 is a top plan view, with parts broken away, of the carbon monoxide ventilation system of the present invention.

FIG. 2 is a top plan view, illustrating that the indicating device 24 is located on the sensor 20. The reset button 26 is also located on the sensor 20, along with indicia 28 indicating "reset".

Figure 3:
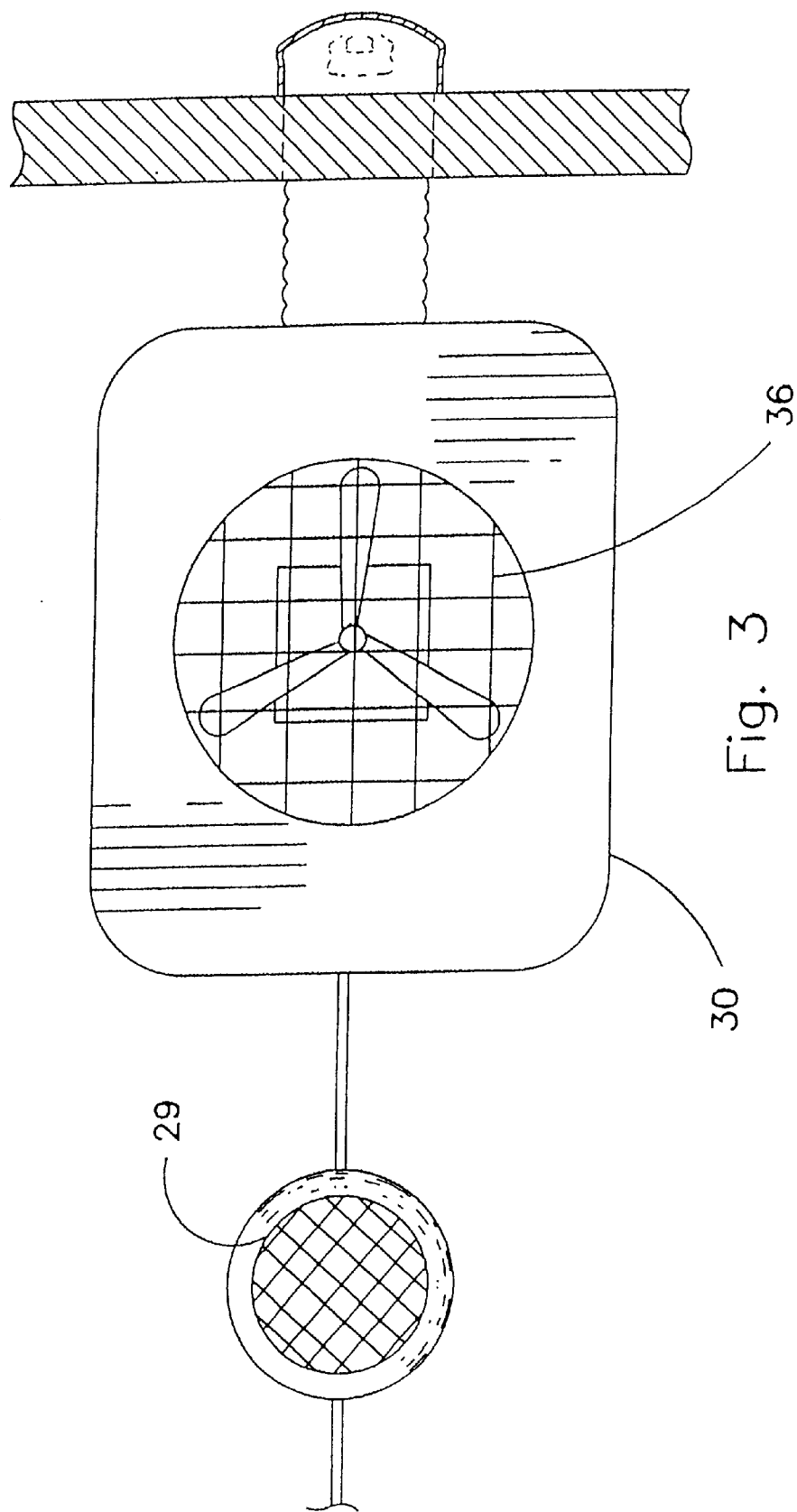
FIG. 3 is a bottom plan view, with parts broken away, of the carbon monoxide ventilation system of the present invention.

FIG. 3 is a bottom plan view, illustrating that the sensor 20 includes an actual sensor element 29 which is typically directed downward, to maximize sensitivity to gases—especially those beginning to collect in a low lying area. Also illustrated is the filter 36 in the fan unit 30. The filter 36 may be made from either a small mesh, to effectively capture small particles such as dust, or from a large mesh as illustrated, to simply prevent injuries from the fan blades.

In conclusion, herein is presented a carbon monoxide ventilation system which employs a sensor to detect the presence of carbon monoxide above a threshold level, and then activates a fan in response thereto. The fan vents the carbon monoxide to an exterior area, and then is shut down by the sensor when carbon monoxide levels are below the threshold level. The system further provides indication that the system has been activated. Said indication persists until manually reset by pressing a reset button, so that personnel are warned of a potentially dangerous condition.

In an alternate embodiment, the objective is to exhaust carbon monoxide quickly before it diffuses with and contaminates the air in occupied space. This is done by providing an exhaust system specifically to protect against malfunction of home or commercial heating systems which are one of the prime sources of contamination.

For example, FIG. 4 shows a boiler 50 with flue 52 and oil burner 51, although a gas fired boiler can be protected in the same manner. An exhaust system 53 with an exhaust fan and an AC operated CO detector and alarm is coupled to outlet flexible conduit 54 which conveys CO contaminated air to the outdoors. By mounting system 53 at ceiling level adjacent to the heating system, fumes 55 from a defective flue 52, boiler 50 or burner 51 can be detected and quickly exhausted before they seep into the living quarters. Preferably, exhaust system 53 would have inlet vents on the bottom as well as a side surface as shown.

In the case of a hot air furnace as shown in FIG. 5, exhaust system 73 with CO detector, alarm, and exhaust fan is preferably mounted inside or against the exterior vertical wall of air plenum 71 which is in contact with the heat exchanger surface heated by gas or oil furnace 70. A most insidious type of failure is perforation of the heat exchanger wall accelerated by improper firing or simply by normal wear in an older unit. In such a case, return air which may enter by a grill 75 as shown (or by a return duct—not shown) is actually mixed with combustion gasses containing CO and then blown throughout the occupied environment 74 through the supply duct 72 and eventually through the supply vents in the various rooms. System 73 short-circuits this condition by venting the contaminated air 56 right from plenum 71 to the outdoors. It is further understood that sensor and exhaust system 73 is positioned away from the actual firing igniting mechanism of the furnace, so as not to have false readings. System 73 can also optionally be shielded from the flashes of heat of the igniter in the furnace, or can be located exterior of the furnace.

Figure 6:
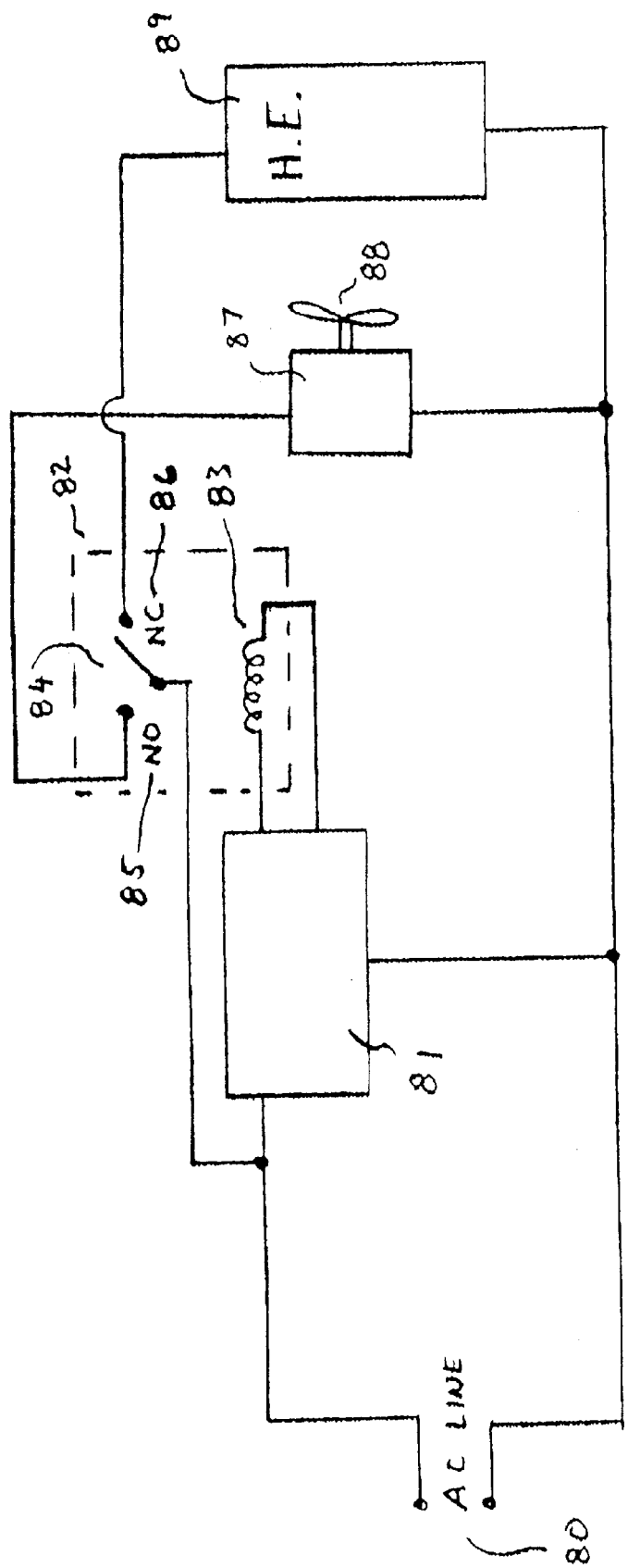

The block diagram of FIG. 6 shows another important feature of systems 53 or 73. CO detector alarm powered by AC line 80 also controls relay 82 with single pole double throw switch 84. The normally closed contact 86 supplies power to heating system 89. For a hydronic oil fired system, this would include oil burner 51. For any gas appliance, this would also include a solenoid operated gas supply valve. For a hot air system, this would also include the hot air distribution blower. When CO levels above the threshold are detected by detector 81, relay 82 coil 83 is energized thereby shifting switch 84 to normally open contact 85 which interrupts all heating equipment 89 loads and simultaneously sends power to AC induction motor 87 which powers exhaust fan 88. Therefore, the effect is two-fold, contaminated air is exhausted while the source of the contamination is shut down.

It is further noted that under certain winter conditions of below freezing temperatures, the systems of FIGS. 1–5 can be programmed to reactivate by a thermostat if the interior temperature of the building approaches freezing, but while the alarm conditions continue to be emitted, such as blinking lights, auditory alarm signals, vibrations, or remote communication to a central alarm service establishment. For example, the alarm condition can be vibration of an article of furniture, such as disclosed in U.S. Pat. No. 5,917,420 of Gonzalez, which discloses a smoke/fire detector which is connected to an alarm apparatus which shakes a piece of furniture, such as a bed, chair or other piece of furniture, to awake a hearing impaired or other person. In Gonzalez '420, the detector generates a signal that energizes an electric motor that produces vibrations which shake the article of furniture. The shaking occurs when the rotary power of the motor engages a cam, which engages a vibratory plunger located on an underside of the bed, chair or other article of furniture. However, Gonzalez does not describe or suggest the use of an exhaust fan to exhaust carbon monoxide.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A carbon monoxide ventilation system, for use in an interior area and ventilating to an exterior area of a building, comprising in combination:
    a building having a wall having an interior mounting surface and an exterior surface adjacent to ambient outside air;
    a vent in communication with said exterior surface of said wall;
    a boiler and burner within said building with an exhaust gas flue extending from said boiler through an outside wall of said building;
    a fan unit located in the interior area near said flue, said fan unit connected to the vent, said fan unit having a motor and a propeller for drawing air from the interior and expelling it to the exterior through said vent, said fan unit having inlet vents on a surface thereof so that any exhaust fumes escaping from said flue would enter said fan unit;
    said fan unit having a filter for capturing particle before detrimentally engaging said propeller;
    said fan unit having a sensor for detecting the presence of carbon monoxide entering through said inlet vents and supplying power to said fan unit without affecting operation of said boiler and burner so that said boiler and burner can continue to operate without exhaust fumes seeping into living quarters of said building, said sensor having an alarm indicating device and a reset button, wherein the indicating device remains activated until reset by said reset button; and
    said vent having a downward extending outlet for preventing entrance of rain and snow therein.

2. The carbon monoxide ventilation system as recited in claim 1, wherein said indicating device produces a distinct warning when a extreme threshold carbon monoxide level is detected.

3. A carbon monoxide ventilation system, for use in an interior area and ventilating to an exterior area of a building, having an exhaust system specifically to protect against malfunction of a home or commercial heating systems comprising in combination:
    a building having a wall having an interior mounting surface and an exterior surface adjacent to ambient outside air;
    a furnace in said building, said furnace capable of producing carbon monoxide gas;
    a vent in communication with said exterior surface of said building wall;
    a fan unit located in an interior area adjacent to said furnace, said fan unit connected to said vent, said fan unit having a motor and a propeller for drawing gaseous air from said interior area and expelling said gaseous air to an exterior ambient environment through said vent;
    said fan unit having a filter capturing and preventing particles from detrimentally engaging said propeller;
    a sensor mounted in a sensor housing, said sensor detecting the presence of carbon monoxide and supplying power to said fan once a threshold level has been reached;
    said sensor having an alarm indicating device that is activated once the threshold level has been reached, said sensor having a reset button, said alarm indicating device remains activated until reset by said reset button, an AC induction motor powered by an alternating current (AC) electrical power line controlling a relay with a single pole double throw switch, wherein a normally closed contact supplies electrical power to said furnace, said relay and said switch control operation of a hot air distribution blower, wherein when carbon monoxide levels are determined to be above a predetermined threshold detected by said sensor, a coil of said relay is energized, thereby shifting said switch to a normally open contract interrupting all heating equipment loads and simultaneously sending power to said AC induction motor which powers said exhaust fan to exhaust said contaminated air while a source of said contaminated air is simultaneously shut down;
    said exhaust fan and said sensor and alarm indicating device being coupled to an outlet flexible conduit conveying carbon monoxide contaminated air to the outdoors; and said sensor and exhaust system being programmed to be reactivated by a thermostat if an interior temperature of said building approaches freezing under certain winter conditions of below freezing temperatures.

4. The carbon monoxide ventilation system as in claim 3, wherein said relay and said switch control operation of a solenoid operated gas supply valve supplying gas to said furnace.

5. The carbon monoxide ventilation system as in claim 3, wherein said vent has a downward extending outlet for preventing of entrance of rain and snow therein.

6. The carbon monoxide ventilation system as in claim 3 wherein said alarm indicating device is at least one blinking light.

7. The carbon monoxide ventilation system as in claim 3 wherein said alarm indicating device is at least one auditory alarm signal.

8. The carbon monoxide ventilation system as in claim 3 wherein said alarm indicating device is a vibratory alarm.

9. The carbon monoxide ventilation system as in claim 3 wherein said alarm indicating device is a remote communication to a central alarm service establishment.

* * * * *